(12) United States Patent
Bolshtyansky et al.

(10) Patent No.: US 6,456,426 B1
(45) Date of Patent: Sep. 24, 2002

(54) RAMAN AMPLIFIERS WITH MODULATED PUMPS

(75) Inventors: Maxim A. Bolshtyansky, Bound Book, NJ (US); Chien-Jen Chen, Cupertino, CA (US); William S. Wong, San Jose, CA (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/922,920

(22) Filed: Aug. 7, 2001

Related U.S. Application Data
(60) Provisional application No. 60/301,139, filed on Jun. 28, 2001.

(51) Int. Cl.$^7$ ............................. H01S 3/10; G02B 6/26
(52) U.S. Cl. ..................... 359/334; 359/160; 359/337; 359/341.31; 359/341.33; 372/70
(58) Field of Search ............................. 359/134, 160, 359/334, 337, 341.31, 341.33; 372/3, 70

(56) References Cited

U.S. PATENT DOCUMENTS

| | | | |
|---|---|---|---|
| 4,881,790 A | 11/1989 | Mollenauer | 350/96.16 |
| 5,191,628 A | 3/1993 | Byron | 385/27 |
| 5,323,404 A | 6/1994 | Grubb | 372/6 |
| 5,596,448 A | 1/1997 | Onaka et al. | 359/341 |
| 5,623,508 A | 4/1997 | Grubb et al. | 372/3 |
| 5,673,280 A | 9/1997 | Grubb et al. | 372/3 |
| 5,917,969 A * | 6/1999 | Gavrilovic et al. | 385/15 |
| 5,959,750 A | 9/1999 | Eskildsen et al. | 359/134 |
| 6,052,393 A | 4/2000 | Islam | 372/6 |
| 6,115,174 A | 9/2000 | Grubb et al. | 359/334 |
| 6,147,794 A | 11/2000 | Stentz | 359/334 |
| 6,151,160 A | 11/2000 | Ma et al. | 359/341 |
| 6,163,636 A | 12/2000 | Stentz et al. | 385/24 |
| 6,178,038 B1 | 1/2001 | Taylor et al. | 359/341 |
| 6,181,464 B1 | 1/2001 | Kidorf et al. | 359/334 |
| 6,275,250 B1 * | 8/2001 | Sanders et al. | 347/247 |
| 6,275,313 B1 | 8/2001 | Denkin et al. | 359/124 |
| 6,373,621 B1 * | 4/2002 | Large et al. | 359/334 |
| 2001/0030796 A1 * | 10/2001 | Yao | 359/334 |

FOREIGN PATENT DOCUMENTS

| | | |
|---|---|---|
| WO | WO 99/66607 | 12/1999 |
| WO | WO 00/49721 | 8/2000 |
| WO | WO 00/73849 A1 | 12/2000 |

OTHER PUBLICATIONS

Berntson et al, BCOC 2000, 26th European Conf. on Optical Comm., Pt. vol. 3,; AN 7268258, Sep. 2000.*

Zhu et al. "1.28 Tbit/s (32×40 Gbit/s) Transmission over 1000 km NDSF employing Distributed Raman Amplification and Active Gain Flattening" Electronics Letters, vol. 37, No. 1, pp. 43–45 (Jan. 4, 2001).

Emori et al. "Cost–Effictive Depolarization Diode Pump Unit Designed for C–band Flat Gain Raman Amplifiers to Control EDFA Gain Profile" pp. 106–108.

Takeda et al. "Active Gain Tilt Equalization by Preferentially 1.43μm– or 1.48μm– Pumped Raman Amplification" OSA Optical Amplifiers and their Applications, vol. 30, pp. 101–105 (1999).

Masuda "Review of Wideband Hybrid Amplifiers" 25$^{th}$ Optical Fiber Communication Conference, Technical Digest, pp. 2–4, (Mar. 7, 2000).

(List continued on next page.)

Primary Examiner—Nelson Moskowitz
(74) Attorney, Agent, or Firm—Fish & Neave; G. Victor Treyz

(57) ABSTRACT

Optical amplifiers are provided in which optical gain is produced by Raman pumping fiber. The Raman-pumped fiber may be a span of transmission fiber or a coil of fiber in a discrete amplifier. Raman pump light may be provided using laser diodes operating at different wavelengths. The Raman pump light that is produced by the laser diodes may be modulated to reduce pump interactions in the fiber. Raman pump light may be modulated by directly modulating the laser diodes or by using optical components that modulate constant power pump light from the laser diodes.

23 Claims, 9 Drawing Sheets

OTHER PUBLICATIONS

Lewis et al. "Low–Noise High Gain Dispersion Compensating Broadband Raman Amplifier" $25^{th}$ Optical Fiber Communication Conference, Technical Digest, pp. 5–7, (Mar. 7, 2000).

Fludger et al. "Inline Loopbacks for Improved OSNR and Reduced Double Rayleigh Scattering in Distributed Raman Amplifiers" OFC.

Stentz "Progress on Raman Amplifiers" OFC '97 Technical Digest, p. 343.

Hansen et al. "Raman Amplification for Loss Compensation in Dispersion Compensating Fibre Modules" Electronics Letters, vol. 34, No. 11, pp. 1136–1137, May 28, 1998.

Emori et al. "Broadband Lossless DCF using Raman Amplification Pumped by Multichannel WDM Laser Diodes" Electronics Letters, vol. 34, No. 22, Oct. 29, 1998.

Neilson et al. "10 Gbit/s Repeaterless Transmission at 1.3 $\mu$m with 55.1–dB Power Budget using Raman Post and Preamplifier" OFC '98 Technical Digest, pp. 52–53.

Stentz et al. "Raman Amplifier with Improved System Performance" OFC '96 Technical Digest, pp. 16–17.

* cited by examiner

RAMAN AMPLIFIERS WITH MODULATED PUMPS

This application claims the benefit of provisional patent application No. 60/301,139, filed Jun. 28, 2001.

BACKGROUND OF THE INVENTION

The present invention relates to fiber-optic communications networks, and more particularly, to optical network equipment such as Raman amplifiers in which optical gain is provided using modulated optical pumps.

Fiber-optic networks are used to support voice and data communications. In optical networks that use wavelength division multiplexing, multiple wavelengths of light are used to support multiple communications channels on a single fiber.

Optical amplifiers are used in fiber-optic networks to amplify optical signals. For example, optical amplifiers may be used to amplify optical data signals that have been attenuated by fiber spans and components in fiber-optic links. A typical amplifier may include erbium-doped fiber coils that are pumped with diode lasers. Raman amplifiers may also be used. Discrete Raman amplifiers may use coils of fiber to provide Raman gain. Distributed Raman amplifiers provide gain in the transmission fiber spans that are used to carry optical data signals between network nodes.

The fiber in Raman amplifiers may be pumped by single-wavelength sources such as diode lasers. However, the Raman gain spectrum produced by a single-wavelength source often does not have the spectral shape that is desired.

The gain spectrum of a Raman amplifier may be modified using a spectral filter. For example, a gain equalization filter may be used to produce a relatively flat gain spectrum by introducing optical losses that compensate for the non-flat shape of the Raman gain spectrum. However, the optical losses associated with using the filter consume optical power and tend to increase the noise figure of the Raman amplifier because additional gain is required to offset the loss.

Another approach for pumping Raman amplifiers involves using a Raman pump source based on multiple diode laser pumps, each of which operates at a different pump wavelength. With this type of approach, the diode laser pumps are each driven at an appropriate current to provide a Raman gain contribution. The overall gain of the Raman amplifier is determined by the Raman gain contributions of each of the individual Raman pump lasers.

If a sufficient number of diode laser pumps are used, it may be possible to produce a desired gain shape such as a flat gain shape for the Raman amplifier without using filters. However, the noise figure performance of the shortest wavelength channels may be adversely affected by cross-pump coupling effects.

It is therefore an object of the present invention to provide arrangements for pumping Raman amplifiers that reduce the effects of coupling between pumps.

It is also an object of the present invention to provide Raman amplifiers having modulated laser diode pumps.

SUMMARY OF THE INVENTION

These and other objects of the invention are accomplished in accordance with the present invention by providing optical amplifiers for use in fiber-optic communications links in fiber-optic networks. The fiber-optic links may be used to carry optical data signals in a signal band associated with wavelength-division-multiplexing channels. Multi-wavelength Raman pumps may be used to provide Raman gain for the optical data signals in the signal band. The Raman gain may be provided using discrete or distributed Raman amplifiers or hybrid amplifiers that include Raman-pumped fiber and optically-pumped rare-earth-doped fiber such as erbium-doped fiber.

The multiwavelength Raman pumps may include diode lasers for producing Raman pump light. The laser diodes may operate at wavelengths that are about a Stokes shift below the signal band. The laser diodes may be modulated to reduce the effects of energy transfer between Raman pumps. Reducing such pump-to-pump interactions may improve the performance of the amplifier.

Pump power may be conserved by modulating the laser diodes using optical components that are controlled by a control unit. The pump light for the laser diodes may be modulated using an arrangement based on a fiber delay loop and a polarization controller that is modulated at a frequency that matches the delay associated with the fiber loop. With this arrangement, a constant laser diode output power may be transformed into a modulated pump signal with minimal loss of pump power. Optical components based on phase controllers may also be used to modulate the pump light.

In-span isolators with pump bypasses may be used to improve the performance of distributed Raman amplifiers that use modulated pump light. Pump light modulation may help to allow amplifier systems to be upgraded without adversely affecting preinstalled Raman amplifier pumps.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
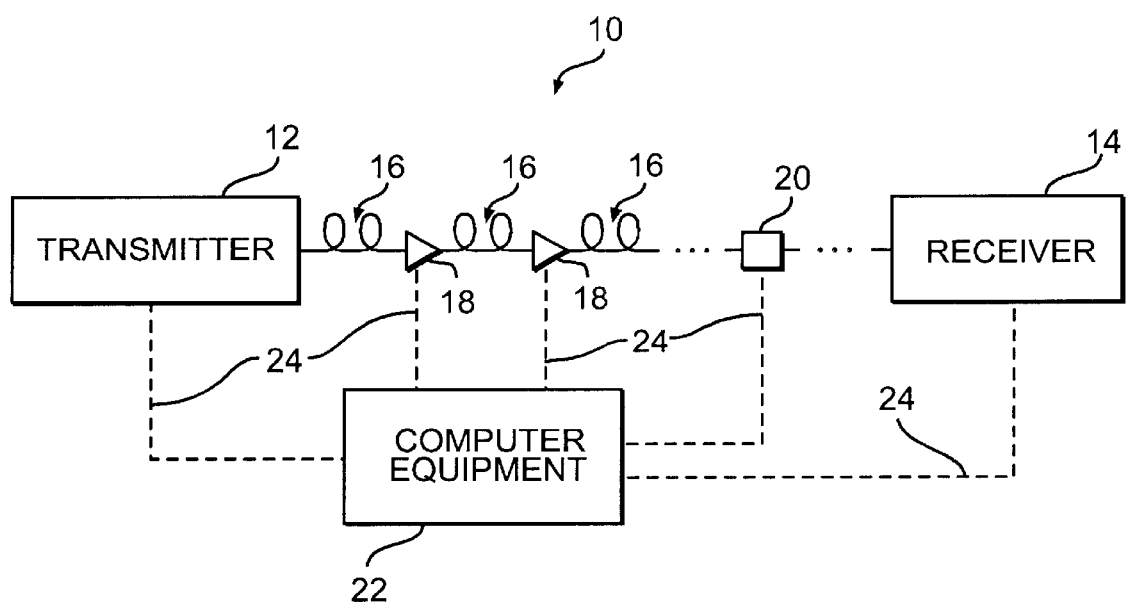
FIG. 1 is a schematic diagram of an illustrative fiber-optic communications link in accordance with the present invention.

An illustrative fiber-optic communications link 10 in an optical communications network in accordance with the present invention is shown in FIG. 1. A transmitter 12 may transmit information to a receiver 14 over a series of fiber links. Each fiber link may include a span 16 of optical transmission fiber. Fiber spans 16 may be on the order of 40–160 km in length for long-haul networks or may be any other suitable length for use in signal transmission in an optical communications network. Link 10 may be a point-to-point link, part of a fiber ring network, part of a network with a star or mesh topology, or part of any other suitable network or system.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527–1605 nm. These are merely illustrative system characteristics. If desired, fewer channels may be provided, more channels may be provided (e.g., hundreds of channels), signals may be carried on multiple wavelengths, signals may be modulated at slower or faster data rates (e.g., at approximately 2.5 Gbps for OC-48 or at approximately 40 Gbps for OC-768), and different carrier wavelengths may be supported (e.g., individual wavelengths or sets of wavelengths in the range of 1240–1670 nm).

Optical amplifiers 18 may be used to amplify optical signals on link 10. Optical amplifiers 18 may include booster amplifiers, in-line amplifiers, and preamplifiers. Optical amplifiers 18 may include Raman pumps for pumping transmission fiber or discrete coils of fiber. Raman pump light from the Raman pumps may produce Raman gain in the fiber through stimulated Raman scattering. Typically the wavelength of the Raman pump light is about a Stokes shift in wavelength (about 13 THz in frequency) below the signal band. Multiple pump light wavelengths may be used to provide a desired Raman gain spectrum. If desired, optical amplifiers 18 may include other optical gain media. For example, optical amplifiers 18 may include optically-pumped rare-earth-doped fiber such as optically-pumped erbium-doped fiber or semiconductor optical amplifiers.

Optical amplifiers 18 may be discrete amplifiers (e.g., discrete Raman amplifiers or discrete hybrid rare-earth/Raman amplifiers) or may be distributed amplifiers that use Raman pumps for producing distributed Raman gain in associated transmission fibers spans 16. If desired, optical amplifier 18 may produce optical gain using both discrete gain components and distributed Raman amplification.

Link 10 may include optical network equipment such as transmitter 12, receiver 14, and amplifiers 18 and other optical network equipment 20 such as dispersion compensation modules, dynamic filter modules, add/drop multiplexers, optical channel monitor modules, Raman pump modules, optical switches, etc. For clarity, aspects of the present invention will be described primarily in the context of optical network equipment 20 such as optical amplifiers 18. This is, however, merely illustrative. The features of the present invention may be used with any suitable optical network equipment having optical gain elements based on Raman-pumped fiber if desired.

Computer equipment 22 may be used to implement a network management system. Computer equipment such as computer equipment 22 may include one or more computers or controllers and may be located at network nodes and one or more network management facilities. As indicated by lines 24, the network management system may communicate with optical amplifiers 18, transmitter 12, receiver 14 and other optical network equipment 20 using suitable communications paths. The communications paths may be based on any suitable optical or electrical paths. For example, communications paths 24 may include service or telemetry channel paths implemented using spans 16, may include wired or wireless communications paths, may involve communications paths formed by slowly modulating the normal data channels on link 10 at small modulation depths, etc. Paths 24 may also be used for direct communications between amplifiers 18 and other optical network equipment.

Computer equipment 22 may issue commands to amplifiers 18, transmitters 12, receivers 14, and other equipment 20 that direct this equipment to make appropriate adjustments. The adjustments may be used to optimize the gain or signal spectrum flatness along link 10, may be used to optimize the end-to-end or node-to-node signal-to-noise ratio across the signal band or spectrum, or may be used to implement any other suitable control or optimization functions for link 10.

Figure 2:
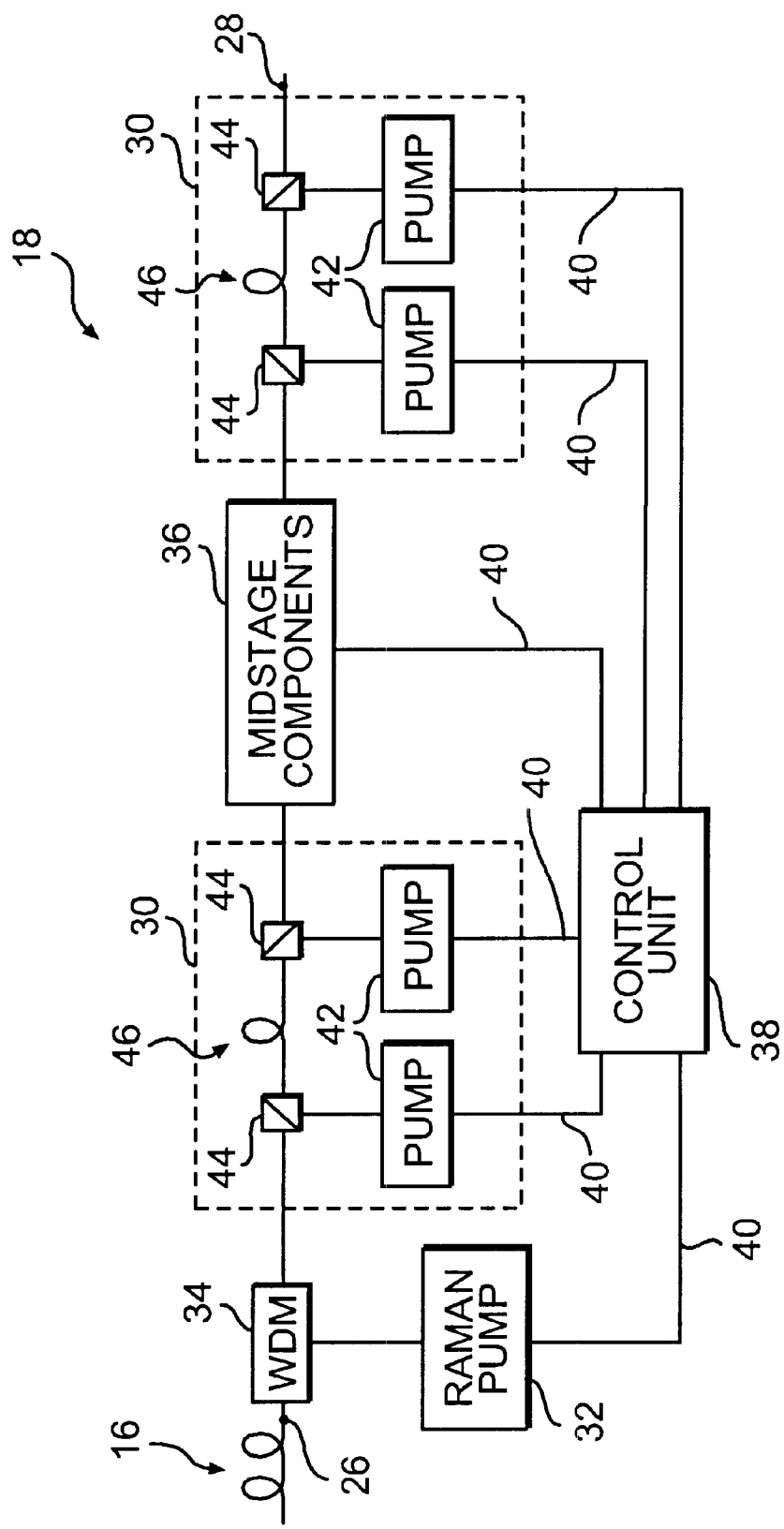
FIG. 2 is a schematic diagram of an illustrative optical amplifier in accordance with the present invention.

An illustrative amplifier 18 is shown in FIG. 2. Optical signals from a span of fiber 16 may be provided to input 26. Corresponding output signals may be provided at output 28. Optical gain may be provided by one or more discrete gain stages such as gain stages 30. Optical gain may also be provided using a distributed Raman amplifier arrangement. Distributed Raman gain may be provided in the transmission fiber of span 16. Raman pump light for span 16 may be provided by Raman pump 32. A pump coupler 34 such as a wavelength-division-multiplexing coupler or other suitable pump coupler may be used to couple pump light from pump 32 into fiber 16.

Amplifier 18 may have other components if desired. For example, amplifier 18 may have midstage components 36. The additional components in amplifier 18 may include taps for optical monitoring (e.g., for gain transient control functions), dispersion compensation elements, switches, filters, isolators, circulators, optical channel monitors, and other suitable components. The components may be located at any suitable location in amplifier 18 (e.g., between input 26 and output 28).

The amplifier gain stages such as gain stages 30 may be optically pumped using pumps 42. Pump light from pumps 42 may be coupled into fiber coils 46 using pump couplers 44. Pump couplers 44 may be wavelength-division-multiplexing couplers or any other suitable pump couplers. The pump sources in pumps such as Raman pump 32 and pumps 42 may be laser diodes, fiber lasers, or any other suitable sources of pump light.

Fiber 46 may be rare-earth-doped fiber such as erbium-doped fiber or may be fiber that is used for providing Raman gain. If fiber 46 is used for producing Raman gain, fiber 46 may have a relatively small core area to enhance Raman pumping efficiency. Small core area fiber that may be used to provide Raman gain includes dispersion-compensating fiber. When fiber 46 is Raman pumped, pumps 42 may be referred to as Raman pumps.

If desired, the fiber coils 46 in amplifier 18 may include both Raman-pumped fiber and rare-earth-doped fiber. Any suitable number of coils 46 may be used. For example, one, two, three, four, five, six, seven, or more coils may be used in amplifier 18. In the example of FIG. 2, coils 46 are both copumped and counterpumped. This is merely illustrative. Each coil 46 may be only copumped or only counterpumped if desired. For example, Raman-pumped coils 46 may be counterpumped to reduce the effects of pump noise.

Operation of amplifier 18 may be controlled using control unit 38. Control unit 38 may be based on any suitable control electronics and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc. Control unit 38 may be connected to the components of amplifier 18 using paths such as electrical paths 40.

The amplifier configuration of FIG. 2 may be used to provide distributed Raman gain in span 16 and discrete gain (Raman gain, rare-earth-doped-fiber gain, both Raman and rare-earth-doped fiber gain, etc.) in gain stages 30. In FIG. 2, the distributed Raman amplifier portion of amplifier 18 and the discrete portion of amplifier 18 are shown as being controlled by a single control unit 38. This is merely illustrative. For example, Raman pump 32 may be provided as part of a Raman pump module. The Raman pump module and the discrete gain portions of amplifier 18 may be controlled by separate control units. Another suitable approach involves controlling the discrete and distributed Raman portions of amplifier 18 using a Raman pump module controller. Combinations of these control arrangements or other suitable control arrangements (e.g., network-based control arrangements) may also be used.

Figure 3:
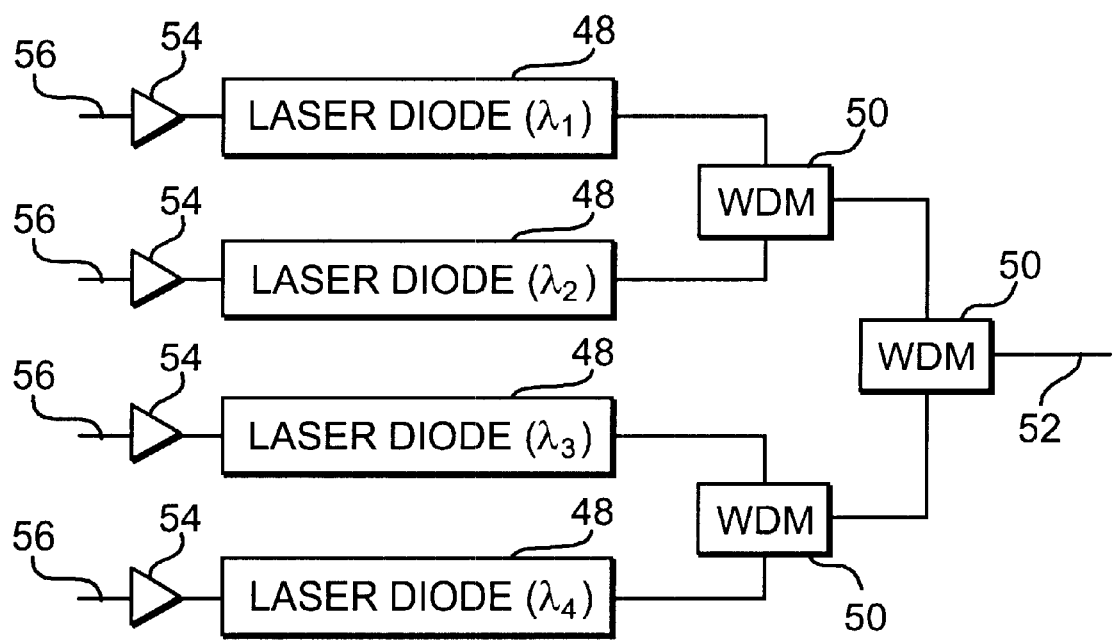
FIG. 3 is a schematic diagram of an illustrative Raman pump arrangement based on laser diodes operating at different wavelengths in accordance with the present invention.

A illustrative Raman pump 32/42 that may be used in amplifier 18 as Raman pump 32 or one or more of pumps 42 is shown in FIG. 3. In the example of FIG. 3, pump 32/42 has multiple diode lasers 48. Diode lasers 48 may operate at different wavelengths. If desired, some laser diodes may use polarization beam combiners or other arrangements that allow the light from two diode lasers operating at the same wavelength (or different wavelengths) to be combined. Some or all of laser diodes 48 of FIG. 3 may use such an arrangement for increasing their output power and reducing their degree of polarization.

The illustrative arrangement of FIG. 3 shows a pump 32/42 that has four different pump wavelengths. This is merely illustrative. A multiwavelength Raman pump may be used that produces light at two, three, four, five, six, seven, eight, or more wavelengths. Single wavelength Raman pumps may also be used in portions of amplifier 18 if desired.

Each of the laser diodes 48 may be driven by an associated current driver 54. Current drivers 54 may be provided as part of control unit 38. Control electronics in control unit 38 may be used to individually control each of the drivers 54 using paths 56. Paths 56 may be analog or digital control lines. This arrangement allows the output power of each laser diode 48 to be controlled. The output light from the laser diodes 48 may be combined onto a single fiber 52 using one or more wavelength division multiplexing couplers 50 or other suitable optical multiplexer arrangements. Fiber 52 may be coupled to span 16 or one of coils 46 using an appropriate coupler, as shown in FIG. 2.

Figure 4:
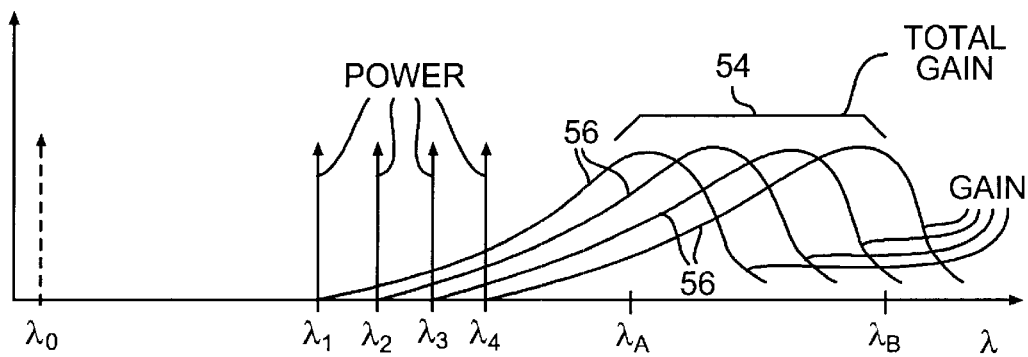
FIG. 4 is a graph of an illustrative Raman gain spectrum that may be produced using a multiwavelength Raman pump in accordance with the present invention.

An illustrative Raman gain spectrum that may be produced by Raman pumping fiber at multiple wavelengths is shown in FIG. 4. As shown in the graph of FIG. 4, a multiwavelength pump may be used to produce pump power at four wavelengths ($\lambda_1$, $\lambda_2$, $\lambda_3$, and $\lambda_4$). The pump light at each wavelength may produce a corresponding Raman gain spectrum 56. The total gain spectrum 54 that is produced in the Raman-pumped fiber results from a contribution from each of the individual gain spectra 56. The relative pump strengths of the different pump wavelengths may be selected to produce a desired shape for gain spectrum 54. For example, the relative pump strengths may be selected to produce a flat gain spectrum at a desired gain level. As another example, the relative pump powers for each wavelength may be selected to produce a tilted gain spectrum. These are merely illustrative examples. In general, the pump powers of the different wavelength pump light components from the Raman pumps may be selected to produce any desired Raman gain spectrum.

When all of the laser diodes 48 are driven at a constant power (e.g., when the laser diodes 48 are operated in CW mode), the pump light at the shorter wavelengths tends to provide optical gain for the pump light at the longer wavelengths. For example, pump light at $\lambda_1$ may pump the pump light at $\lambda_4$. This cross-pump pumping effect results in a transfer of pump power from the shorter pump wavelengths to the longer pump wavelengths as the pump light propagates down the Raman-pumped fiber.

Figure 5:
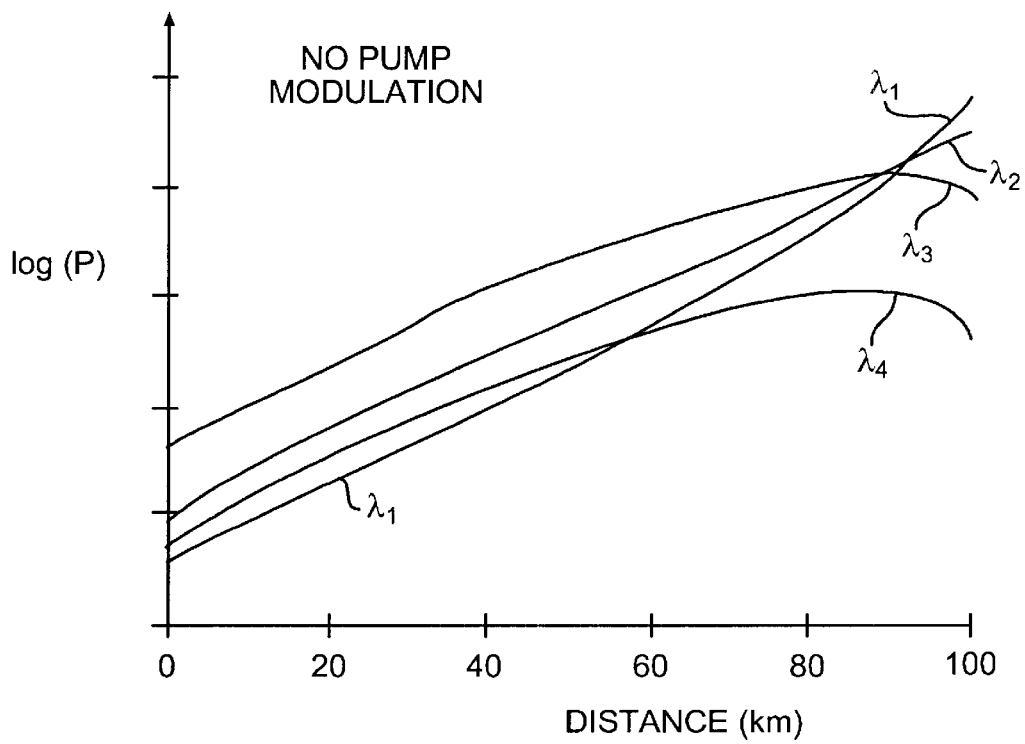
FIG. 5 is a graph showing the evolution of Raman pump powers at different wavelengths along a length of Raman-pumped fiber in accordance with the present invention.

A graph showing the evolution of the pump powers of a multiwavelength pump as a function of distance from the pump light launch location is shown in FIG. 5. In the graph of FIG. 5, four wavelengths of pump light (e.g., $\lambda_1=1432$ nm, $\lambda_2=1458$ nm, $\lambda_3=1493$ nm, and $\lambda_4=1500$ nm) have been launched in the counterpumped direction along the fiber of span 16. The distance of 100 km corresponds to the pump power launch point (the downstream end of fiber span 16 adjacent to the other components of amplifier 18). The distance of 0 km corresponds to the beginning or upstream end of fiber span 16. Although the example of FIG. 5 is based on a 100 km transmission fiber span 16. The same type of graph may be used to explain the pump power evolution in spans of other lengths or in discrete coils of Raman-pumped fiber such as fiber coils 46.

As shown in FIG. 5, the pump powers of all wavelengths drop as the pump light propagates through the fiber. The pump powers drop due to fiber losses and due to consumption of the pump power from signal loading. Because of cross-pump pumping effects, the presence of the longer wavelength pump light causes the power of the pump light at the shorter wavelengths to drop more rapidly in the fiber as a function of distance than would otherwise occur. This is because part of the power of the shorter wavelength pump light is used to amplify the pump light at the longer wavelengths.

When pump light at all wavelengths is present simultaneously, the pump light at the longer wavelengths is maintained at a higher level than would otherwise be possible due to the transfer of pump power from the shorter wavelength pump light. For some wavelengths (e.g., $\lambda_3$ and $\lambda_4$ in the example of FIG. 5), the power of the pump light may initially increase after it has been launched into fiber 16. This increases the extent to which the pump light at $\lambda_3$ and $\lambda_4$ penetrates into fiber 16 towards the signal source. The increased penetration of the pump light at $\lambda_3$ and $\lambda_4$ improves the noise figure performance of the distributed Raman amplifier in the longer wavelength portion of the Raman gain spectrum (i.e., the portion of the Raman gain spectrum that is attributable to pumping by the longer wavelength pumps). This enhancement to the noise figure performance in the longer wavelength portions of the signal band occurs at the expense of reduced noise figure performance in the shorter wavelength portions of the signal band due to accelerated pump depletion at the shorter pump wavelengths.

In accordance with the present invention, the pump light at some or all of the pump wavelengths may be modulated to reduce the effects of cross-pump pumping. By reducing the amount that the shorter wavelength pump light transfers pump power to the longer wavelength pump light, the attenuation of the shorter wavelength pump light may be reduced. This extends the distance into the fiber that the shorter wavelength pump light penetrates. Because the shorter wavelength pump light penetrates further into the fiber, the noise figure performance for the portion of the signal band that receives Raman gain contributions from the shorter wavelength pump light is enhanced.

Figure 6:
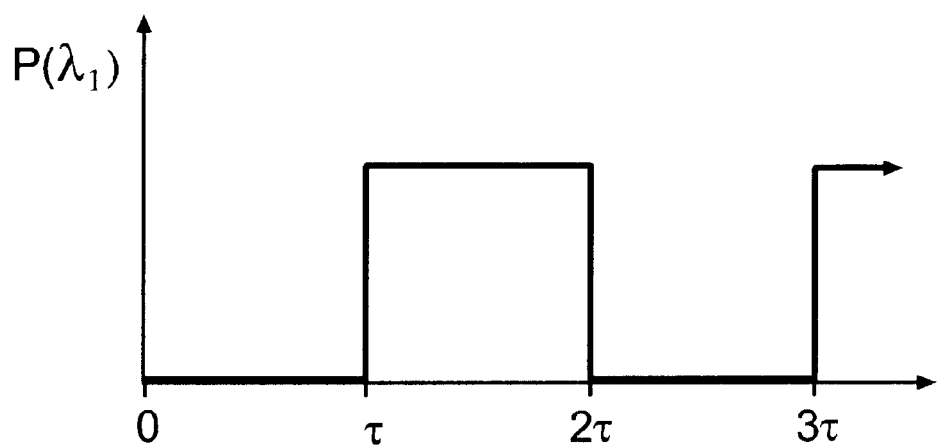
FIGS. 6 and 7 are graphs showing how the Raman pump light at different wavelengths may be modulated in accordance with the present invention.
Figure 7:
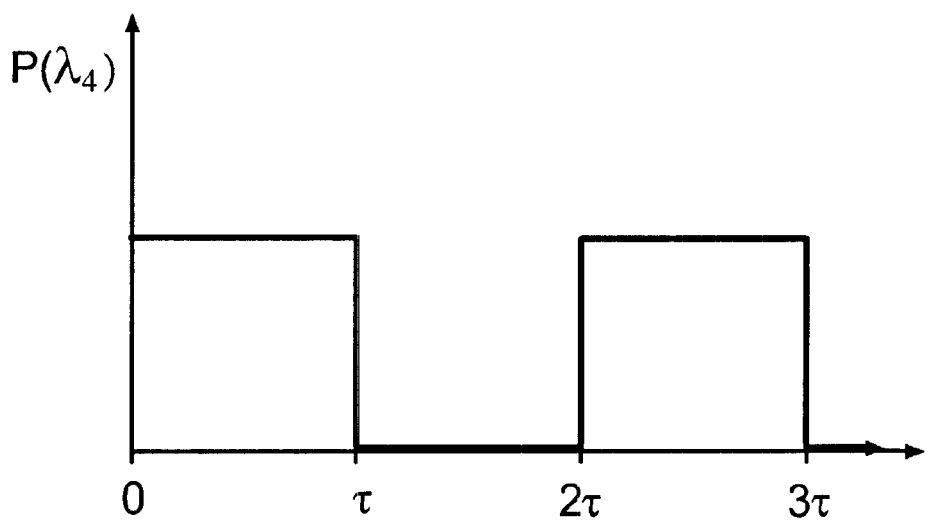

Any suitable modulation scheme may be used to reduce the effects of cross-pump pumping. As shown in FIGS. 6 and 7, for example, two of the laser diodes 48 in pump 32/42 (FIG. 3) such as the $\lambda_1$ pump and $\lambda_4$ pump may be modulated using out-of-phase square waves. The pump power of the pump light at $\lambda_1$ is shown in FIG. 6. The pump power of the pump light at $\lambda_4$ is shown in FIG. 7. The modulated pump light may be launched into fiber 16 or fiber 46 using a counterpumping arrangement.

With this type of scheme, the pump light at both $\lambda_1$ and $\lambda_4$ contributes to the Raman gain in the signal band, as shown in FIG. 4. However, the pump light at $\lambda_1$ does not produce substantial Raman gain for the pump light at $\lambda_4$, because the pump light at $\lambda_1$ does not propagate down the fiber 16 or 46 with the pump light at $\lambda_4$. The pump light at $\lambda_2$ and $\lambda_3$ may also be modulated or may be produced at a constant level without modulation. If four wavelengths of pump light are used, cross-pump pumping effects may be reduced significantly even if only the shortest and longest wavelengths are modulated out of phase. Modulation of the other pump wavelengths may further reduce cross-pump pumping effects, but may not be necessary.

Any suitable modulation scheme may be used to decouple Raman pump laser diodes operating at different wavelengths. The modulating signals may be used to control drivers 54 of FIG. 3. The modulating signals may be square waves, sine waves, triangular waves, low duty-cycle pulses or any other suitable waves, modulated signals, or series of pulses. The signals may be modulated at any suitable frequency. For example, the signals may be modulated at frequencies in the range of 1 MHz to 10 MHz, 0.1 to 100 MHz, or any other suitable range. The modulation frequency (roughly 1/τ) is preferably sufficiently high that each incoming signal to amplifier 18 passes through multiple periods of the counterpropagating modulated pump light to reduce noise induced by pump modulation. Because the modulation frequency need not be extremely high, the cost of the modulation electronics in the control unit 38 need not be excessive.

Any suitable number of Raman pump laser diodes may be decoupled. For example, four laser diodes may be decoupled by turning on each of them only when the other three laser diodes are off. With this type of approach, each laser diode may be modulated using a 25% duty cycle. Larger duty cycles may be used when a partial overlap of the pump light is acceptable. Another suitable approach involves modulating some wavelengths (e.g., $\lambda_1$ and $\lambda_2$ in a four wavelength system) so that they are in phase with respect to each other and out of phase with respect to other wavelengths (e.g., $\lambda_3$ and $\lambda_4$ in a four wavelength system). Combinations of these schemes or other suitable modulation schemes may also be used if desired.

Figure 8A:
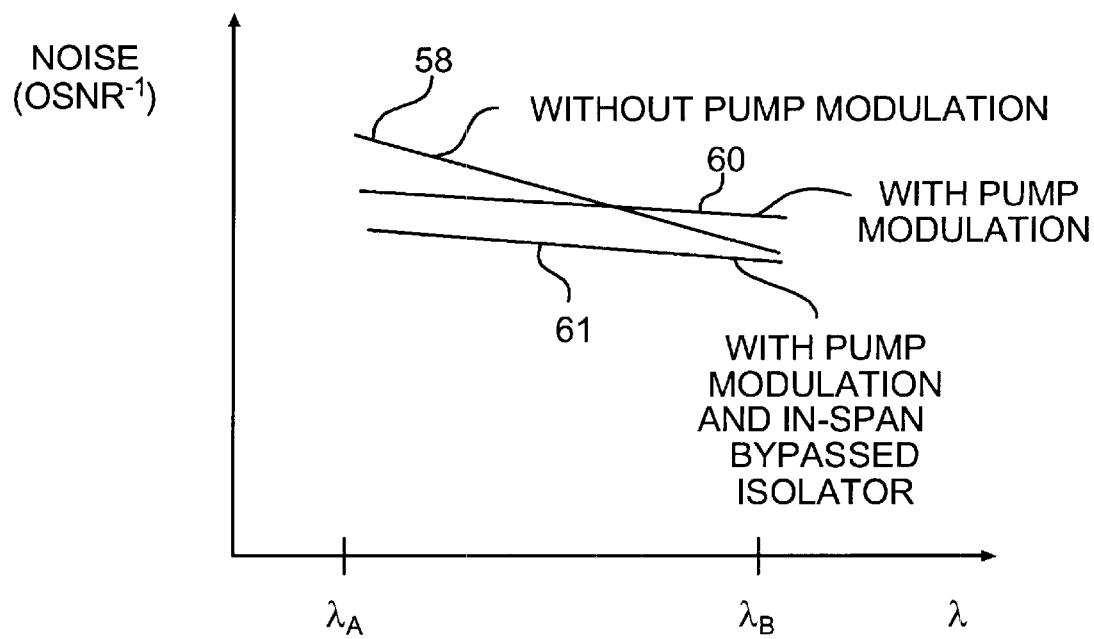
FIG. 8a is a graph showing how the noise performance of an amplifier may be improved when the Raman pump light is modulated in accordance with the present invention.

The impact of modulating the pump light of Raman pump 32/42 to reduce the effects of cross-pump pumping is illustrated in the graph of FIG. 8a. As shown by curve 58 in FIG. 8a, an amplifier with unmodulated pumps may be characterized by noise in the signal band (between $\lambda_A$ and $\lambda_B$) that is higher for shorter wavelengths than for longer wavelengths. The amount of noise in the signal band may be quantified using parameters such as inverse optical signal-to-noise ratio, noise figure, or other suitable noise criteria. When many channels are active on a given span 16, part of the increase in noise at the short wavelengths may be due to signal-to-signal (cross-channel) Raman pumping between the shorter and longer wavelength signals as they travel together along link 10. Another part of this noise penalty at shorter wavelengths is due to the accelerated depletion of the shorter wavelength pump light due to pump-to-pump pumping, as described in connection with FIG. 5. By modulating the pump light to decouple the pump sources and reduce pump-to-pump interactions, the noise performance of amplifier 18 may be improved at shorter wavelengths, due to the increased penetration of the shorter wavelength Raman pump light into the transmission fiber span 16. This is shown by curve 60.

Figure 8B:
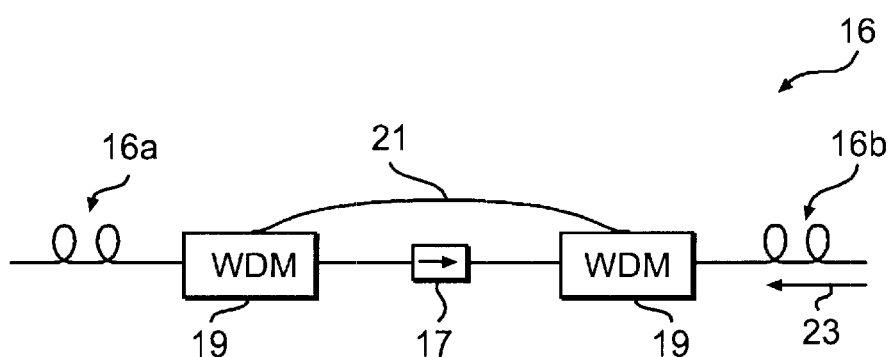
FIG. 8b is a schematic diagram of an illustrative in-span isolator arrangement that may be used to improve system performance in accordance with the present invention.

A further improvement may be obtained by using isolators in spans 16 to reduce the effects of double-Rayleigh backscattering. An illustrative span 16 having an in-span isolator is shown in FIG. 8b. As shown in FIG. 8b, in-span isolator 17 may be provided with a pump bypass. The pump bypass may include wavelength-division-multiplexers 19 and bypass fiber 21. With this type of arrangement, Raman pump light that is launched into span 16 provides Raman gain in fiber subspans 16a and 16b. Isolator 17 reduces double-Rayleigh backscattering noise. The pump bypass formed from couplers 19 and bypass fiber 21 directs Raman pump light that is propagating in direction 23 from fiber 16b to fiber 16a past isolator 17.

Any suitable number of isolators or other isolating components may be used in a given span 16 if desired. Because the noise contribution due to double-Rayleigh backscattering noise is decreased, the noise performance of the distributed Raman amplifier may be improved across the entire signal band as shown by curve 61 in FIG. 8a.

Further improvements to the noise performance of the Raman amplifier may be provided by using additional Raman pumping to pump the shortest wavelength pumps. With this type of scheme, Raman pump light at, for example, $\lambda_0$, may be located about a Stokes shift in wavelength (13 THz in frequency) below the shortest Raman pump light (e.g., $\lambda_1$) that is being used to provide Raman gain for the signal band ($\lambda_A$–$\lambda_B$) as shown by the dotted line in FIG. 4. The pump light at $\lambda_0$ provides gain for the pump light at $\lambda_1$, so the pump light at $\lambda_1$ penetrates farther into the span 16. This increased penetration tends to increase the performance of the amplifier at the signal band wavelengths that receive Raman gain from the pump light at $\lambda_1$ (i.e., the shorter signal band wavelengths near $\lambda_A$).

There may be a reduction in the power output capabilities of a given laser diode 48 when the laser diode is modulated.

The maximum continuous (CW or DC) output power of the laser may be greater than the maximum time-averaged output power of the modulated laser. This may require the use of a laser diode with greater power handling capabilities or a reduction in the amount of modulation that is used. When two laser diodes are modulated with the 50% duty cycle shown in the example of FIGS. 6 and 7, there may be little or no overlap between the pump light signals from the two laser diodes, resulting in minimal pump-to-pump interactions. Greater power may be obtained from the lasers by increasing the on-time of the lasers until each laser is on for 70% of the time (as an example) and is off for 30% of the time, provided that slightly greater pump-to-pump coupling is acceptable using such a partially out-of-phase scheme.

Figure 9:
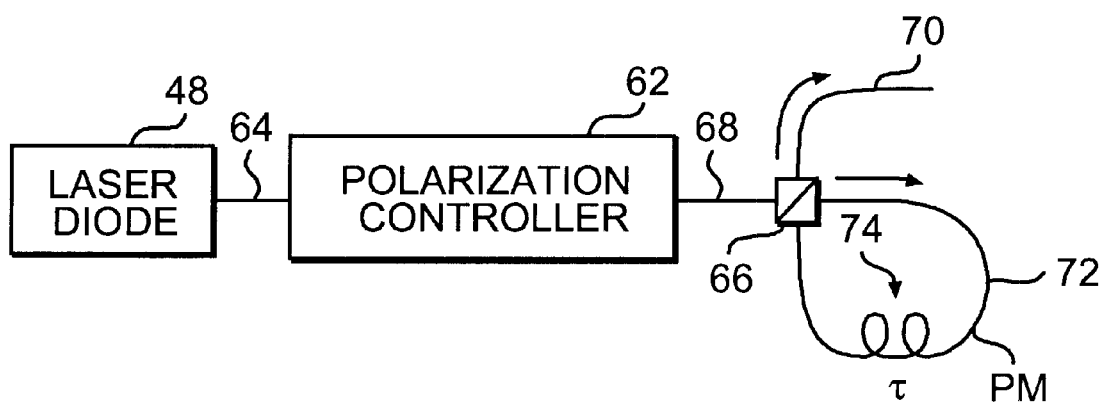
FIG. 9 is a schematic diagram of an illustrative pump arrangement that allows Raman pump light from a source such as a laser diode to be modulated with minimal loss of pump power in accordance with the present invention.

An arrangement that conserves pump power while allowing a 50% duty cycle (for example) is shown in FIG. 9. As shown in FIG. 9, continuous (CW) pump light from laser diode 48 may be provided to a polarization controller 62 (polarization scanner) at a constant power level using fiber 64. Polarization controller 62 may be based on any suitable polarization controlling element. For example, polarization controller 62 may be a liquid crystal polarization controller, a polarization controller based on thermooptic or electrooptic components, or a fiber-squeezer or acoustooptic dynamic polarization controller.

The pump light exiting laser diode 48 is typically linearly polarized. Polarization controller 62 may rotate or modulate the polarization state of this light. Polarization controller 62 may modulate the polarization of the pump light at any suitable frequency. For example, polarization controller 62 may rotate the polarization of laser diode 48 at 1–10 MHz, 0.1–100 MHz, or any other suitable frequency. The polarization controller may, if desired, modulate the polarization state of the pump light between a generally p-polarized state and a generally s-polarized state or other suitable modulation schemes may be used.

After passing through polarization controller 62, the pump light may be provided to polarization beam splitter 66 over fiber path 68. Polarization beam splitter 66 may split the pump light into two portions based on polarization. Each pump light portion contains a series of pump light pulses created by passing the polarization-varying signal through the beam splitter. A first portion of the pump light (e.g., the portion of the pump light that is s-polarized) may be directed onto output path 70. A second portion of the pump light (e.g., the portion of the pump light that is p-polarized) may be directed onto delay path 72. A coil of fiber 74 in path 72 may serve as an optical delay line. The delay time $\tau$ that is associated with coil 74 may be equal to half of the period of the drive signal that is used to modulate polarization controller 62 (plus any suitable integral number of periods).

Fiber 72 may be polarization-maintaining fiber that provides the p-polarized light from output 72 back into polarization beam splitter 66, where it passes to output 70 and combines with the s-polarized first portion of the light. Because the delay time $\tau$ is equal to half of the period of the modulation signal, the pulses in the second portion of the pump light shifted in time by an amount equal to half of the period of the modulation signal. As a result, when the two portions of pump light are recombined in splitter 66, the pulses in the first portion and the pulses in the second portion coincide with each other. The output of the system of FIG. 9 is therefore a stream of pulses (e.g., on-off pulses based on square waves, sine waves, or other suitable functions) at the modulation frequency. With this arrangement, the laser diode 48 may operate at a constant power level (e.g., its maximum CW power). There is no need to reduce the CW output power of laser diode 48 to accommodate pump power modulation.

The example of FIG. 9 shows the modulation of a single wavelength. Two wavelengths (e.g., $\lambda_1$ and $\lambda_4$ in the example of FIG. 4) may be modulated out of phase or partly out of phase using this arrangement and the modulated light may be combined using a wavelength-division-multiplexing coupler arrangement or other optical multiplexing arrangement. The modulated light may be combined with CW light or modulated light at other wavelengths (e.g., $\lambda_2$ and $\lambda_3$ in the example of FIG. 4) if desired.

Figure 10:
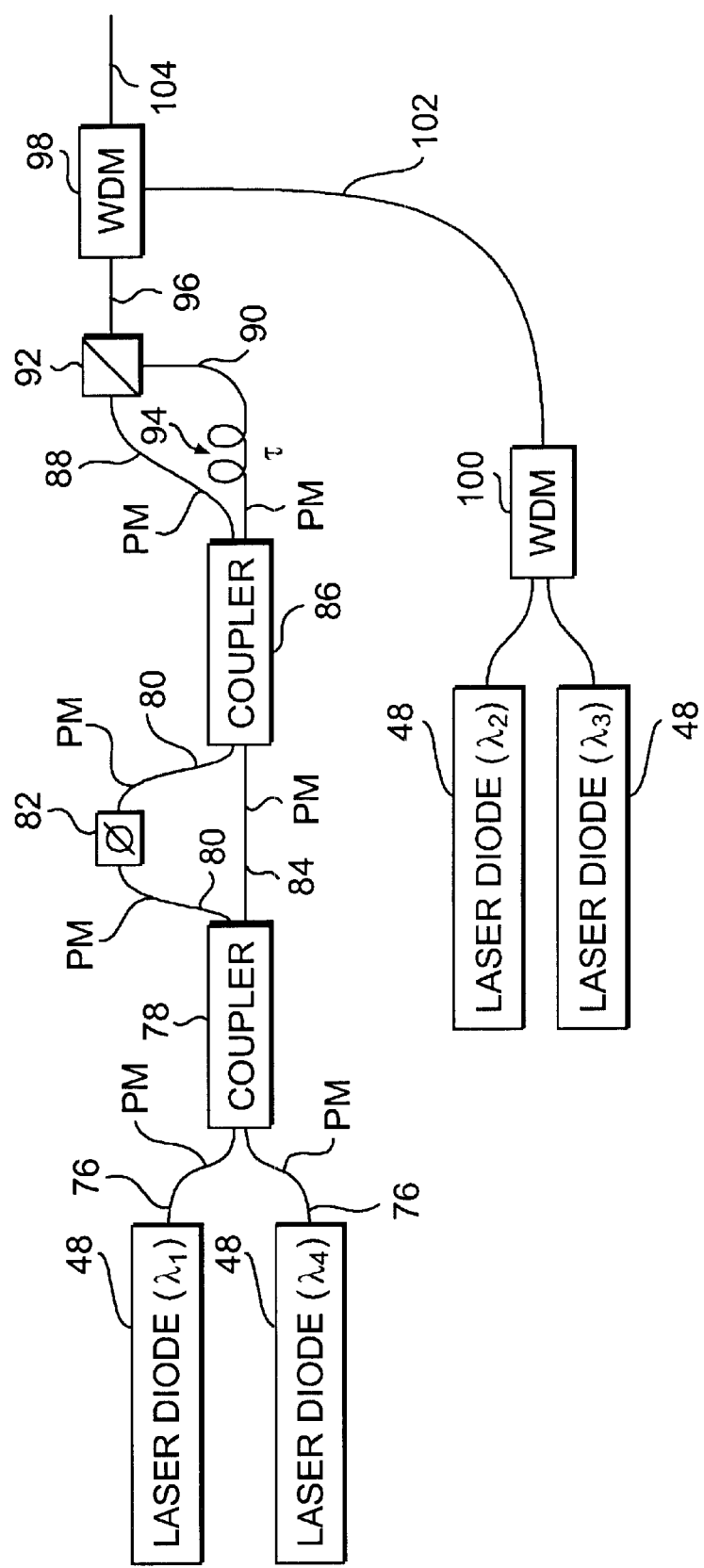
FIG. 10 is a schematic diagram of another illustrative pump arrangement that allows Raman pump light from a source such as a laser diode to be modulated with minimal loss of pump power in accordance with the present invention.

Another suitable approach for conserving pump power while producing modulated pump light is shown in FIG. 10. With the system of FIG. 10, laser diodes 48 operating at two wavelengths ($\lambda_1$ and $\lambda_4$) produce CW pump light that is to be modulated. The constant power (CW) pump light at $\lambda_1$ and $\lambda_4$ may be provided to a 2×2 coupler 78 over associated lengths of polarization-maintaining fiber 76. The fiber 76 helps to maintain the linear polarization state of the pump light at $\lambda_1$ and $\lambda_4$. The coupler 78 divides the pump light at $\lambda_1$ and $\lambda_4$ into two paths.

A first portion (e.g., the first half) of the divided light is passed along polarization-maintaining fiber 80 to 2×2 coupler 86. A phase controller 82 is located in this path for controlling the phase of the first portion of the divided light. Phase controller 82 may be based on any suitable phase modulating element or device, such as a liquid crystal device, electrooptic device, thermooptic device, acoustooptic device, fiber-based device, fiber squeezer device, microelectromechanical systems (MEMS) device, etc. A second portion (e.g., the second half) of the divided light is passed along polarization-maintaining fiber 84 to coupler 86.

Phase controller 82 may modulate the phase of the light in path 80 at any suitable frequency. For example, phase controller 82 may change the phase of the light in path 80 at 1–10 MHz, 0.1–100 MHz, or any other suitable frequency. Control unit 38 may be used to control the operation of phase controller 82. The phase change produced by phase controller 82 may vary between (for example) 0 and $\pi$ phase shift.

The light from fibers 80 and 84 is combined in coupler 86. The outputs of coupler 86 are connected to polarization-maintaining fibers 88 and 90. If desired, couplers 78 and 86 may be formed as part of the same device as phase controller 82. For example, all three of these components may be formed using an electrooptic material or other structure. When this type of structure is used, fibers 80 and 84 may be replaced by planar waveguides.

Couplers 78 and 86, phase modulator 82, and fibers 80 and 84 (or other such waveguides) form a Mach-Zehnder type of modulator or switch. The light that is directed to the outputs of coupler 86 is controlled by the state of phase controller 82 and the default configuration of couplers 78 and 86 and phase controller 82. As an example, when the phase produced by phase controller 82 is 0, the pump light at $\lambda_1$ may be directed to fiber 88 and the pump light at $\lambda_4$ may be directed to fiber 90. When the phase produced by phase controller is $\pi$, the pump light at $\lambda_4$ may be directed to fiber 88 and the pump light at $\lambda_1$ may be directed to fiber 90.

A polarization beam combiner 92 may be used to combine the light on polarization-maintaining fibers 88 and 90. Polarization-maintaining fiber 90 includes a coil 94 of extra fiber that produces a time delay $\tau$ for the light in fiber 90 relative to the light in fiber 88. The delay time $\tau$ is equal to half of the period of the phase modulation produced by phase controller 82. Polarization-maintaining fiber 90 may also have a 90° twist, which rotates the polarization state of the light in fiber 90 by 90°. The twist allows light from fiber 90 to be combined with light from fiber 88. The combined output light is provided to fiber 96.

With this arrangement, light at $\lambda_1$ oscillates between fibers 88 and 90 at a frequency dictated by phase controller 82. The polarization beam combiner 92 combines the light at $\lambda_1$ from fiber 88 with the light at $\lambda_1$ from fiber 90. Because the delay time $\tau$ is equal to half of the period of the modulation signal used for phase controller 82, the pulses at $\lambda_1$ from fiber 90 are shifted in time so that they coincide with the pulses at $\lambda_1$ from fiber 80. The same process allows the pulses at $\lambda_4$ to be shifted and combined so that they coincide with each other. The pulses at $\lambda_1$ and $\lambda_2$ are out-of-phase with respect to each other, which reduces the effects of cross-pump pumping (pump-to-pump interactions) in the Raman-pumped fiber.

Pump light at other wavelengths (e.g., CW pump light at $\lambda_2$ and $\lambda_3$ from laser diodes 48 in the example of FIG. 10) may be combined with the pump light at $\lambda_1$ and $\lambda_4$ using wavelength division multiplexing couplers 100 and 98 and fiber 102 or any other suitable optical multiplexing arrangement.

The combined pump light at $\lambda_1$, $\lambda_2$, $\lambda_3$, and $\lambda_4$ may be provided to the fiber to be Raman-pumped (e.g., fiber span 16 or fiber 46) using output fiber 104.

In the arrangements of FIGS. 9 and 10, pump power is conserved during modulation by controlling the phase or polarization state of the light, shifting the light using a fiber delay, and recombining the light at the output before using the pump light to Raman pump a fiber. Because the pump light at one wavelength is out-of-phase (partially or completely) with respect to the pump light at another wavelength, pump-to-pump pumping effects are reduced, and the noise performance of amplifier 18 may be enhanced. The illustrative arrangements of FIGS. 9 and 10 are merely illustrative. The pump light at any desired number of pump light wavelengths may be modulated and combined with pump light from any desired number of CW pumps. Moreover, pump light modulation schemes in which laser diodes 48 are modulated directly may be used alone or in combination with pump light modulation schemes in which pump light is modulated using an arrangement based on a phase controller or polarization controller of the types shown in FIGS. 9 and 10. Any suitable number of CW laser diodes 48 may also be used to produce pump light with these arrangements if desired.

Figure 11:
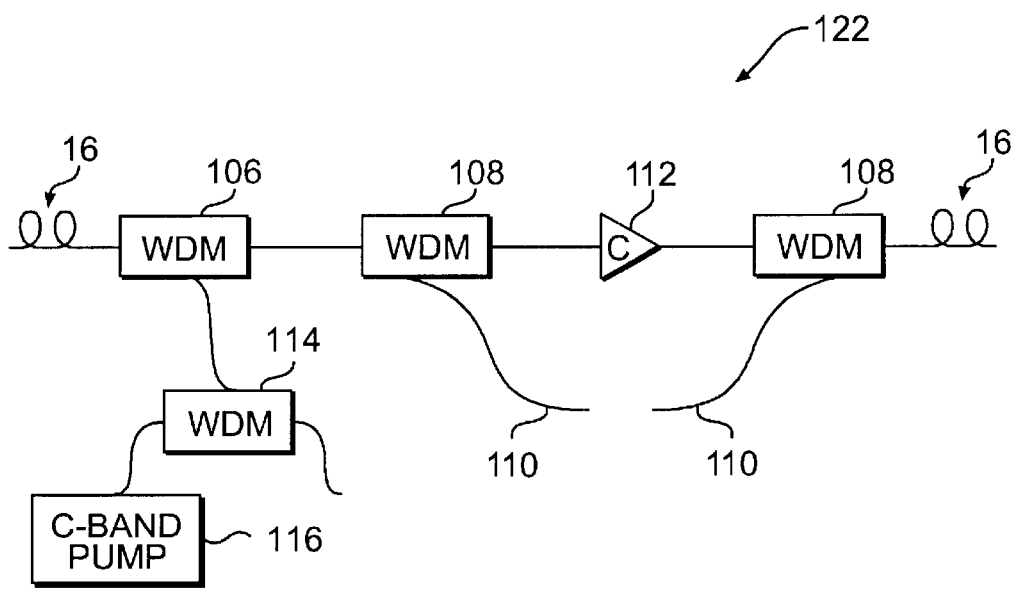
FIG. 11 is a schematic diagram of an upgradable amplifier configuration in accordance with the present invention.
Figure 12:
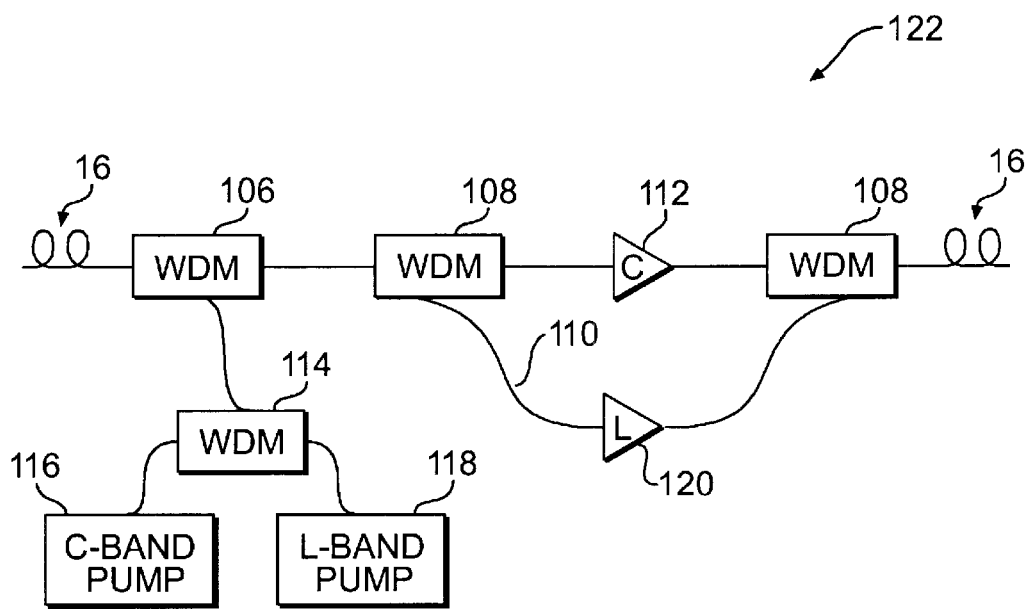
FIG. 12 is a schematic diagram of the upgradable amplifier configuration of FIG. 11 after upgrade elements have been added in accordance with the present invention.

Raman pump modulation may be used to reduce pump coupling effects when a Raman amplifier upgrade is added to existing amplifier equipment. This is shown in FIGS. 11 and 12. Initially, a system 122 may be installed that is based on C-band Raman and erbium-doped fiber amplifiers. Gain may be provided by erbium-doped fiber amplifier 112 and the Raman gain produced by C-band Raman pump 116. Coupler 106 may be used to couple Raman pump light from pump 116 into span 16. Coupler 114 may initially have an unused port. This port may be used to couple L-band Raman pump light into fiber span 16 after an upgrade. Similarly, couplers 108 and fiber 110 may initially be unconnected to any gain stage other than stage 112.

When the system of FIG. 11 is upgraded, an L-band erbium-doped fiber amplifier 120 may be coupled into the fiber path using couplers 108 and fiber 110, as shown in FIG. 12. An L-band Raman pump 118 may be added to the system using the previously unconnected port of coupler 114. The assembled system of FIG. 12 may be used to provide amplification in both the C-band and the L-band. To avoid disturbing the C-band Raman gain spectrum and to help preserve the noise performance of the system in the C-band when the L-band Raman pump is turned on, at least some of the pump signals in the C-band and L-band pumps may be modulated. For example, at least some of the C-band pump lasers in pump 116 may be modulated out-of-phase or partly out-of-phase with respect to at least some of the L-band pump lasers in pump 118. Accordingly, this approach facilitates the upgrade process from C-band systems with Raman amplification to C+L systems with Raman amplification.

Another suitable approach for preserving the C-band performance of the system when the L-band pumps are installed involves adding one or more supplemental pumps. The supplemental pumps may add Raman pump light that provides Raman gain in the C-band or may add Raman pump light that is located about a Stokes shift in frequency below the C-band Raman pump light (e.g., light at $\lambda_0$ as shown in FIG. 4). Such supplemental pumps may help to mitigate the potentially adverse effects on the C-band noise performance of the system when L-band pump light is added. If desired, supplemental pumps may be used in combination with pump light modulation schemes or other suitable arrangements.

The C-band and L-band wavelength ranges of FIGS. 11 and 12 are merely illustrative. If desired, this approach may be used to upgrade any suitable amplifier equipment, regardless of the particular wavelength bands in which the equipment operates.

Although some of the features of the present invention have been described in the context of optical amplifiers 18, this is merely illustrative. The features of the present invention may be used in controlling Raman-pumped fiber in any suitable optical network equipment 20 or network location if desired.

It will be understood that the foregoing is merely illustrative of the principles of this invention, and that various modifications can be made by those skilled in the art without departing from the scope and spirit of the invention.

What is claimed is:

1. An optical amplifier that uses Raman-pumped fiber to amplify optical data signals in a signal band in a fiber-optic communications link, comprising:

a Raman pump that includes a first laser diode that provides Raman pump light at a first wavelength and a second laser diode that provides Raman pump light at a second wavelength, wherein the Raman pump light at the first and second wavelengths is provided to the fiber to produce Raman gain that amplifies the optical data signals; and a control unit that modulates the first and second laser diodes to reduce the effects of cross-pump Raman pumping between the first and second laser diodes.

2. The amplifier defined in claim 1 further comprising a coupler that couples the Raman pump light into the fiber to counterpump the fiber in a direction opposite to that of the optical data signals.

3. The amplifier defined in claim 1 wherein the Raman pump includes a third laser diode that produces unmodulated Raman pump light at a third wavelength.

4. The amplifier defined in claim 1 wherein the Raman pump includes a third laser diode that produces unmodulated Raman pump light at a third wavelength, and wherein the third wavelength is between the first and second wavelengths.

5. The amplifier defined in claim 1 wherein the fiber comprises a span of transmission fiber.

6. The amplifier defined in claim 1 wherein the fiber comprises a span of transmission fiber that includes an in-span isolator.

7. The amplifier defined in claim 1 wherein the fiber comprises a coil of fiber.

8. The amplifier defined in claim 1 wherein the fiber comprises a span of counterpumped fiber.

9. The amplifier defined in claim 1 wherein the control unit modulates the first and second pumps at least partly out of phase at a frequency in the range of 0.1 MHz to 100 MHz.

10. The amplifier defined in claim 1 further comprising an additional Raman pump that provides pump light in the fiber that produces Raman gain for the Raman pump light at the first wavelength.

11. The amplifier defined in claim 1 wherein the first pump is part of a C-band Raman pump and the second pump is part of an L-band Raman pump and wherein the L-band Raman pump and C-band Raman pump.

12. An optical amplifier that uses Raman-pumped fiber to amplify optical data signals in a signal band in a fiber-optic communications link, comprising:
   a Raman pump that includes a first laser diode that provides first Raman pump light at a first wavelength and a second laser diode that provides second Raman pump light at a second wavelength, wherein the Raman pump light at the first and second wavelengths is provided to the fiber to produce Raman gain that amplifies the optical data signals, and wherein the first and second diode lasers are operated at constant powers; and
   optical components that modulate the first and second Raman pump light that is provided by the first and second laser diodes to reduce cross-pump pumping between the first Raman pump light and the second Raman pump light.

13. The amplifier defined in claim 12 wherein the optical components include a polarization controller.

14. The amplifier defined in claim 12 wherein the optical components include a polarization controller and a fiber coil that creates a delay, wherein the polarization controller is modulated at a given period and wherein the delay equals half of the period of the polarization controller.

15. The amplifier defined in claim 12 wherein the optical components include:
   at least one polarization controller that is optically coupled to one of the laser diodes for controlling the polarization state of the pump light from that laser diode, wherein the polarization controller is modulated at a modulation frequency; and
   a polarization beam combiner to which the pump light from the polarization controller is provided, wherein the polarization beam combiner provides a series of pulses of pump light at its output at the modulation frequency.

16. The amplifier defined in claim 12 wherein the optical components include:
   at least one polarization controller that is optically coupled to one of the laser diodes for controlling the polarization state of the pump light from that laser diode, wherein the polarization controller is modulated at a modulation frequency;
   a coil of fiber; and
   a polarization beam combiner having four ports, wherein the pump light from the polarization controller is provided to a first of the polarization beam combiner ports, wherein the coil of fiber is connected between a second and a third of the polarization beam combiner ports, and wherein the polarization beam combiner provides a series of pulses of pump light at its output at the modulation frequency at a fourth of the ports.

17. The amplifier defined in claim 12 wherein the optical components include a phase controller.

18. The amplifier defined in claim 12 wherein the optical components include a phase controller and a fiber coil that creates a delay, wherein the phase controller is modulated at a given period and wherein the delay equals half of the period of the phase controller.

19. The amplifier defined in claim 12 wherein the optical components comprise:
   a first coupler having two inputs to which the first Raman pump light is provided and to which the second Raman pump light is provided, wherein the first coupler has two outputs;
   a second coupler having two outputs and having two inputs that receive pump light from the two outputs of the first coupler; and
   a phase controller between one of the first coupler outputs and one of the second coupler inputs.

20. The amplifier defined in claim 12 wherein the optical components comprise:
   a first coupler having two inputs to which the first Raman pump light is provided and to which the second Raman pump light is provided, wherein the first coupler has two outputs;
   a second coupler having two outputs and having two inputs that receive pump light from the two outputs of the first coupler;
   a phase controller between one of the first coupler outputs and one of the second coupler inputs; and
   a polarization beam combiner that combines the pump light from the two outputs of the second coupler onto a single fiber.

21. The amplifier defined in claim 12 wherein the optical components modulate the first Raman pump light to generate a series of first pulses and modulate the second Raman pump light to generate a series of second pulses and wherein the first series of pulses and second series of pulses are at least partly out of phase with respect to each other.

22. The amplifier defined in claim 12 wherein the optical components modulate the first Raman pump light to generate a series of first pulses and modulate the second Raman pump light to generate a series of second pulses and wherein the first series of pulses and second series of pulses are out of phase with respect to each other.

23. The amplifier defined in claim 12 wherein the Raman pump includes a third laser diode that produces unmodulated Raman pump light at a third wavelength.

* * * * *